United States Patent [19]

Stehning

[11] Patent Number: 4,990,167

[45] Date of Patent: Feb. 5, 1991

[54] SCRUBBING COLUMN FOR AN APPARATUS FOR THE DESULFURIZATION OF FLUE GASES

[75] Inventor: Werner Stehning, Dorsten, Fed. Rep. of Germany

[73] Assignee: Gottfried Bischoff Bau Kompl. Gasreinigungs und Wasserruckkuhlanlagen GmbH & Co. Kommanditgesellschaft, Essen, Fed. Rep. of Germany

[21] Appl. No.: 450,901

[22] Filed: Dec. 14, 1989

[30] Foreign Application Priority Data

Dec. 24, 1988 [DE] Fed. Rep. of Germany ....... 3843810

[51] Int. Cl.⁵ .............................................. B01D 47/06
[52] U.S. Cl. .................... 55/257.1; 55/257.2; 55/440; 261/115; 261/DIG. 9; 422/170
[58] Field of Search ............................. 55/257.1–257.7, 55/440, 442–446; 423/242 R, 242 A; 422/168, 170, 172; 261/115–118, 36.1, DIG. 9

[56] References Cited

U.S. PATENT DOCUMENTS

| | | | |
|---|---|---|---|
| 3,876,396 | 4/1975 | Arnold et al. | 55/440 X |
| 4,515,754 | 5/1985 | Stehning | 422/168 |
| 4,526,764 | 7/1985 | Stehning | 423/242 A |
| 4,533,522 | 8/1985 | Leimkuhler | 422/170 |
| 4,539,024 | 9/1985 | Stehning et al. | 55/443 X |
| 4,539,184 | 9/1985 | Stehning | 261/116 X |
| 4,584,147 | 4/1986 | Stehning | 261/115 |
| 4,626,264 | 12/1986 | Stehning | 55/257.2 X |
| 4,670,224 | 6/1987 | Stehning et al. | 422/170 |

FOREIGN PATENT DOCUMENTS 3301688 7/1984 Fed. Rep. of Germany .
3410110 10/1985 Fed. Rep. of Germany .

Primary Examiner—Richard L. Chiesa
Attorney, Agent, or Firm—Herbert Dubno

[57] ABSTRACT

A cylindrical scrubbing column having a cylindrical water-separator head is provided with an upwardly converging partition defining a diametrically extending elongated slot which communicates between the scrubbing region of the column and the head, the slot being aligned with a radial outlet for the flue gases from the head. The slot is flanked by a pair of longitudinally-extending impingement baffle register walls which remove water from the entraining flue gas by impingement baffle separation techniques and a further wall is provided at the end of the slot turned toward the radial outlet. The walls can converge in the direction of flow of the gas upwardly and the compartments behind the walls communicate with the radial outlet. The system has reduced pressure drop without detrimental effect to the separating efficiency.

10 Claims, 3 Drawing Sheets

SCRUBBING COLUMN FOR AN APPARATUS FOR THE DESULFURIZATION OF FLUE GASES

CROSS REFERENCE TO RELATED PATENTS

This application is related to the following commonly assigned patents:

| U.S. PAT. NO. | Date Issued |
| --- | --- |
| 4,515,754 | 7 May 1985 |
| 4,539,024 | 3 Sep. 1985 |
| 4,539,184 | 3 Sep. 1985 |
| 4,526,764 | 2 Jul. 1985 |
| 4,584,147 | 22 Apr. 1986 |
| 4,626,264 | 2 Dec. 1986 |
| 4,670,224 | 2 Jun. 1987 |

FIELD OF THE INVENTION

The present invention relates to a scrubbing column or tower of the type in which a flue gas in an apparatus for the desulfurization of the flue gases from a boiler firing, especially a power plant boiler firing, are subjected to treatment with a scrubbing liquid containing calcium oxide, calcium carbonate or calcium hydroxide so that a suspension of calcium sulfite and/or calcium sulfate is collected in and withdrawn from the sump.

More particularly, the invention relates to an apparatus of this type in which a liquid separator (droplet separator) of the impingement baffle type at the head of this scrubbing column can strip water, i.e. scrubbing liquid, from the scrubbed gases leaving the column.

BACKGROUND OF THE INVENTION

In the commonly owned German patent document DE-OS 33 01 688 (corresponding to U.S. Pat. No. 4,539,024), an apparatus of the general type to which the invention is directed, has been described.

In this system, the flue gas inlet is provided at the bottom of the generally cylindrical scrubbing column and a flue gas outlet is provided at the head of this column which is of round cross section. Means is provided within the column for feeding the scrubbing liquid into the flue gas rising in the column and the column has a scrubbing liquid sump in which a suspension of calcium sulfite and/or calcium sulfate is collected or is formed. The suspension can be withdrawn from the sump and the head of the scrubbing column has a water separator for stripping liquid, entrained by the flue gas to the head, from the flue gas before it leaves the apparatus.

The flue gas outlet is connected generally radially with the head of the scrubbing column and the water separator comprises a number of water separator registers, i.e. arrays of impingement baffle separator plates or surfaces.

In the construction of this patent document, the water separator forms a crown of water separator registers, each of which comprises a plurality of spaced-apart impingement baffle units surrounding a flue gas inlet region in the center of the crown or array. The registers are located in sectors and are traversed in a radial direction by the flue gas.

Surrounding the crown of liquid separators, is an annular outlet channel for the flue gas and the flow cross section of this channel can progressively increase in the direction of the radial flue gas outlet from a location diametrically opposite this outlet.

In an improvement upon that system described in German Patent Document DE-OS 34 10 110 (U.S. Pat. No. 4,626,264), the annular outlet channel is divided over its periphery by at least two control elements (valve flaps, dampers, or plates) controlled by a servo-mechanism or other effector which can close off the flow cross section so that parts of the outlet channel can be blocked during partial load operations.

The water separation registers can then be caused to function as preseparator and main-separator units as desired.

This system requires a generally circular construction of the head and a generally circular flow of the gas. This construction and gas flow pattern has not proved to be the most effective or desirable in many cases.

OBJECTS OF THE INVENTION

It is the principal object of the present invention to provide a scrubber of the type described in the above-mentioned U.S. patents which extends the principles thereof and provides a construction which is more reliable, functions better and, especially, can reduce pressure drops in the apparatus without a detrimental effect on the degree of separation of the scrubbing liquid from the entraining gas.

Another object is to provide an improved scrubber whereby drawbacks of earlier scrubber arrangements, e.g. in terms of pressure drop or pressure losses, can be avoided.

SUMMARY OF THE INVENTION

These objects and others which will become apparent hereinafter are attained in accordance with the invention in a scrubber for an apparatus for the desulfurization of a flue gas, especially a flue gas derived from a combustion boiler and particularly a fossil-fuel power plant boiler which comprises:

an upright substantially cylindrical column;

inlet means for admitting a flue gas to be scrubbed to the column at a lower portion thereof;

means forming a sump collecting scrubbing liquid in the column below the inlet means;

means connected with the column for introducing a scrubbing liquid into the column and means in the column for spraying scrubbing liquid into a rising stream of the flue gas in the column;

means forming a head with a circular cross section at an upper end of the column, the head being formed with a radial outlet for scrubbed flue gas;

a partition in the head defining an elongated slot-shaped central passage extending along a diameter of the circular cross section in a direction of the radial outlet between an interior of the head and a portion of the column below the head, the scrubbed flue gas passing through the slot-shaped central passage into the head;

a pair of liquid-separator registers flanking the slot-shaped central passage in the head along opposite longitudinal sides of the slot-shaped central passage and traversed by the scrubbed flue gas so that the scrubbed flue gas passes into spaces outwardly of the registers and communicating with the radial outlet; and a further liquid-separator register in the head upstream of the radial outlet and disposed at an end of the slot-shaped central passage proximal to the radial outlet, each of the registers comprising an array of impingement baffles recovering liquid entrained by the scrubbed flue gas traversing the registers as the scrubbed flue gas passes into the radial outlet.

Since the water separator in the cylindrical head of the scrubbing column, according to the invention is provided with the aforementioned partition that defines a central and diametrically extending throughgoing slot for the flue gas and the water-separating registers flank both longitudinal sides of the throughgoing slot so as to constitute water-separator register walls defining, behind these walls, compartments which communicate with the radial flue gas outlet and at the end of the slot, a further water-separator register wall is provided, the gas dynamics of the system enable the flow resistance and thus the pressure loss to be very small.

The gas dynamics are improved in this sense further by having the partition inclined inwardly and upwardly so as to form an inverted funnel, thereby funneling the flue gases entraining the scrubbing liquid against the register walls which can be inclined toward one another upwardly as well.

This inclination serves to distribute the flue gas flow uniformly to all of the register channels since the flow passage becomes narrower in the flow direction.

The circular cross section of the scrubber head can correspond to the circular cross section geometry of the remainder of the scrubber and, in accordance with the principles of the invention, it is possible to have the geometry of the water-separating registers and the layout thereof deviate significantly from the circular geometry.

This greatly simplifies fabrication of the scrubber assembly and, surprisingly, allows a significant reduction in the pressure loss or pressure drop without any detrimental effect on the degree of separation of the liquid from the entraining flue gas.

According to a feature of the invention, a further water-separator register wall is provided in the radial flue gas outlet.

According to the invention and the principles of the patents mentioned above, the water-separator register walls may be combined with the usual rinsing nozzles which can spray rinsing water on the baffle plates to clean them.

The isolation and insulation of the scrubber head in the region of the water separator is not necessary, thereby enabling further structural simplification of the apparatus.

The water-separating registers or water-separator register walls can be easily replaced because there is substantial space available to afford access to these elements.

BRIEF DESCRIPTION OF THE DRAWING

The above and other objects, features and advantages of the present invention will become more readily apparent from the following description, reference being made to the accompanying drawing in which.

DESCRIPTION OF THE PREFERRED EMBODIMENT

Figure 1:
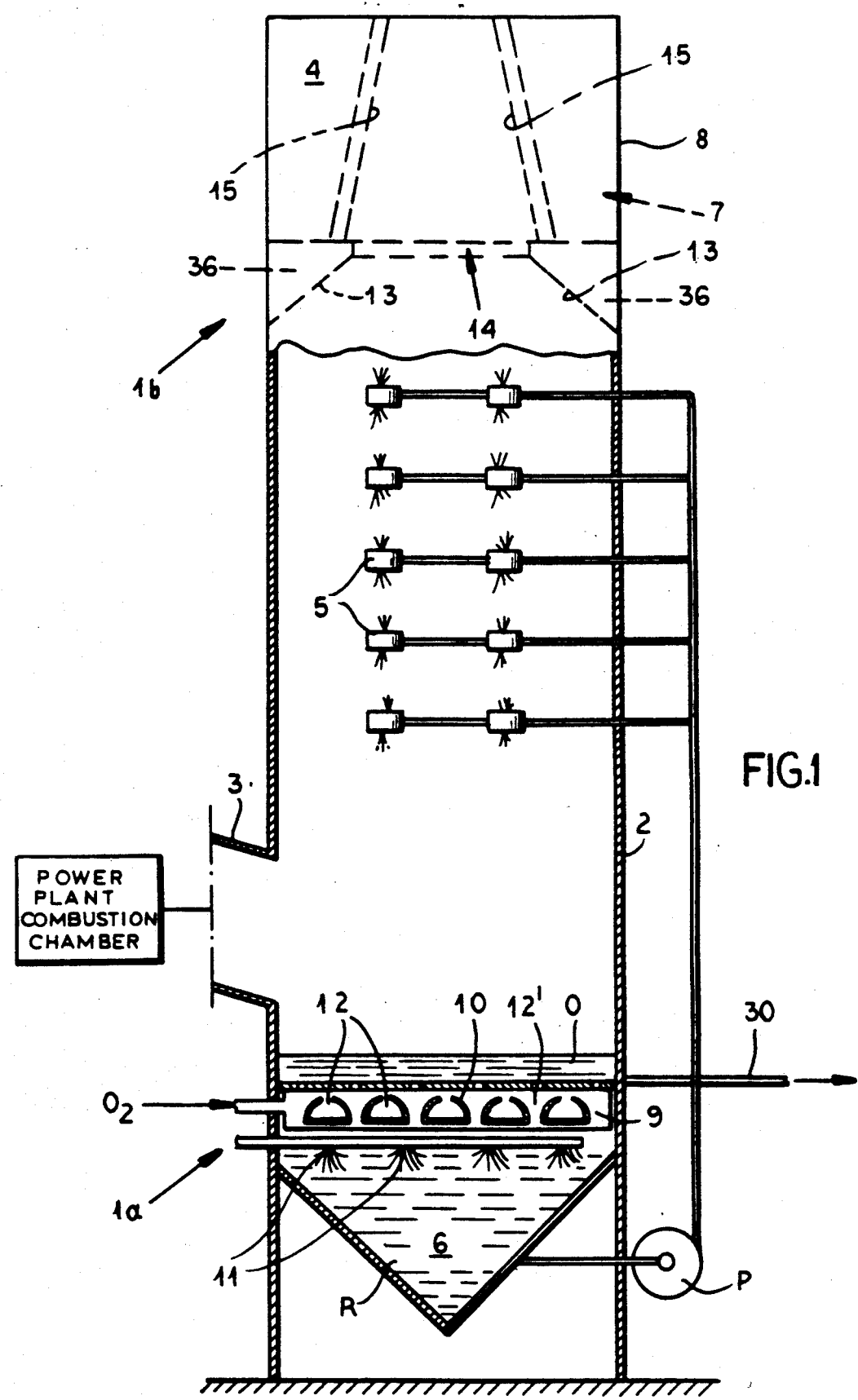
FIG. 1 is an axial section through a scrubbing column according to the invention.

In the drawing is shown a scrubbing column 1 which has a substantially cylindrical upright scrubbing column shell 2 and which is connected in an apparatus for the desulfurization of flue gas downstream from a boiler combustion chamber, especially a combustion chamber of a fossil fuel power plant boiler.

The scrubbing column 1 has a flue gas inlet 3 located in the region of the lower part 1a of the column, a flue gas outlet 4 in the region of the scrubbing column head 1b, and a means 5 in the form of an array of spray nozzles, for discharging the scrubbing liquid into the rising flue gas stream.

At the bottom of the scrubbing column, a sump 6 is provided to collect the scrubbing liquid, reactants formed in the scrubbing liquid and particulates scrubbed from the flue gas.

In the scrubbing column head 1b, a water-separator unit 7 is provided within a cylindrical enclosure 8 from which the flue gas outlet 4 extends substantially radially.

As can be seen from FIG. 1, the apparatus can comprise, in addition, means for the introduction of atmospheric oxygen and additives into the sump liquid within the sump 6.

The scrubbing column region above the sump 6 operates as an absorption region. When the scrubbing liquid contains calcium oxide, calcium hydroxide or calcium carbonate in addition to water, and the flue gas as is usually the case contains sulfur dioxide and sulfer trioxide, a suspension of calcium sulfite and/or calcium sulfate is formed in the sump and can be withdrawn by a duct 30.

The scrubbing liquid sump 6 comprises a horizontal grate 9 of oxygen supply pipes 10 which form an oxidation zone 0 above the grate 9 and a reaction zone R below the grate 9.

The supply of atmospheric oxygen, can, however, be effected in a different manner.

Below grate 9, nozzles 11 can be provided for the supply of additives, for example, fresh scrubbing liquid in which calcium hydroxide is dissolved.

The air supply unit formed by the grate 6 and constituted by the pipes 10, can form downwardly open hoods. The downwardly open hoods can comprise upwardly opening oxygen outlet bores 12 which are known from the aforementioned patent documents and have not been illustrated in detail here.

The spacing between the hoods 10 is so selected that a back flow from the reaction zone R to the oxidation zone 0 is not permitted. In the hoods 10 air cushions 12' are provided so that the scrubbing liquid cannot rain through the ducts from the oxidation zones 0.

Figure 2:
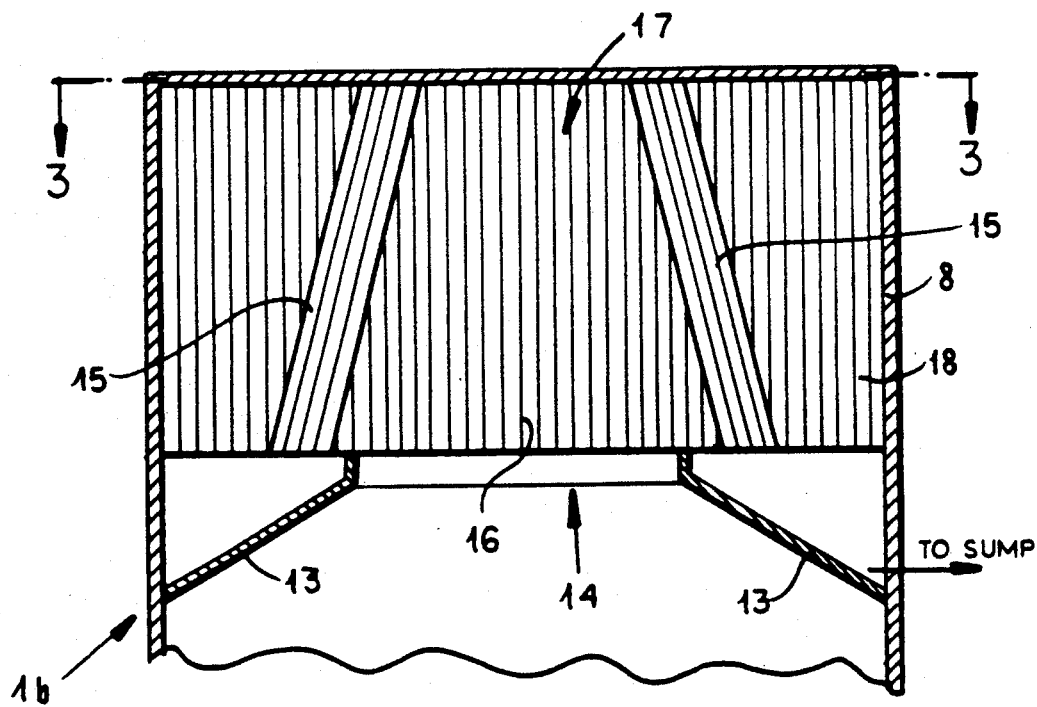
FIG. 2 is a detail view, in section, drawn to a substantially larger scale of the scrubber head of the scrubber of FIG. 1.
Figure 5:
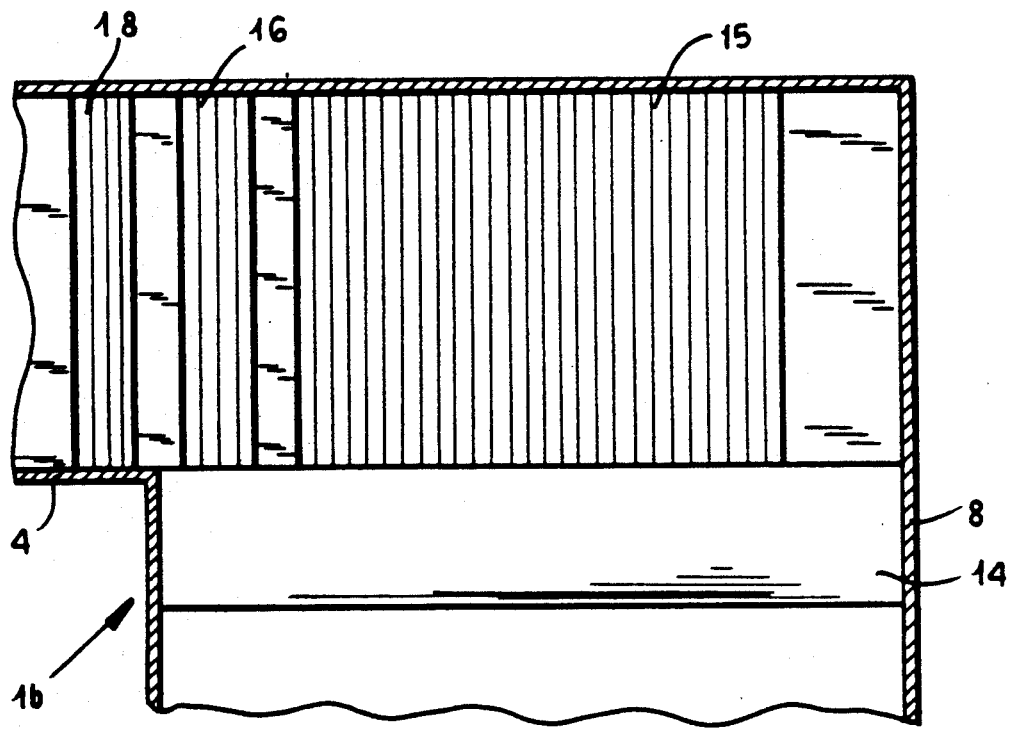
FIG. 5 is a view similar to FIG. 2 but taken in a cross sectional plane at a right angle to that of FIG. 2.

As can be seen from FIG. 2, the water separator 7 has a partition 13 which is formed with a central and diametrically extending throughgoing slot 14 for the flue gas. This slot is aligned with the radial outlet 4.

Figure 3:
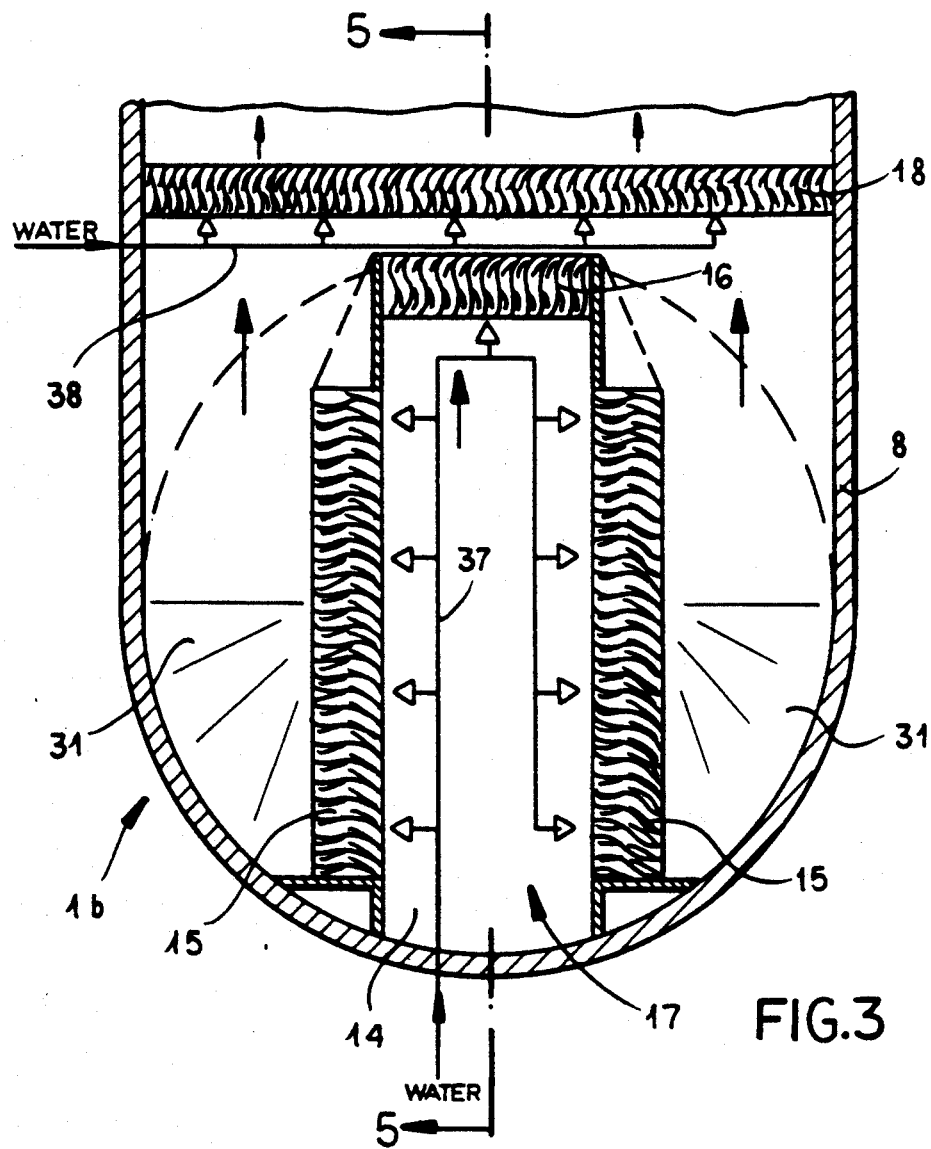
FIG. 3 is a view taken along the line 3—3 of FIG. 2 showing the register walls from above.

The water-separator registers are disposed on opposite longitudinal sides of the slot 14 and are connected to the partition 13 to form water-separator register walls 15. The compartments 31 behind these walls communicate with the radial outlet 4 (see especially FIG. 3).

At the end of the throughgoing slot 14 turned toward the outlet 4 and upstream of this outlet, a further water-separating register wall 16 is provided.

The apparatus is so constructed that the two parts of the partition 13 which define between them the throughgoing slot 14 are inclined upwardly and inwardly to the slot 14.

This has been found to be of significant importance on gas dynamic grounds.

So that all surface elements of the water-scrubbing register walls 15 and 16 receive equal volume flow rates of the flue gas entraining the scrubbing liquid to be separated, the register walls 15 converge upwardly and inwardly and thus are inclined to the vertical so as to define a flow compartment 17 which converges in the direction of flow of the flue gases.

Spaced from these register walls located in the region of the slot 14 and in the radial outlet 4, a further register wall 18 is provided.

Insulation is not required of the scrubbing column hood 1b in the region of the water separator 7.

Figure 4:
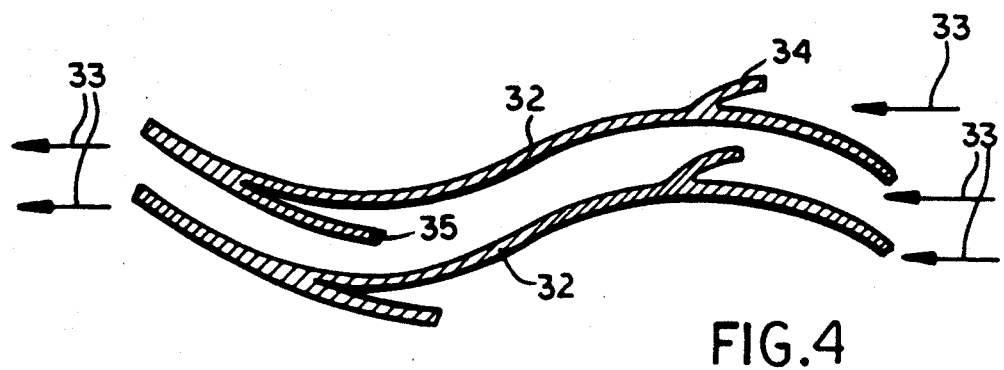
FIG. 4 is a diagram of the baffles of a register wall.

Turning to FIG. 4, it can be seen that each of the water-separator register walls is constituted of an assembly of baffle plates 32 which are traversed by the gas stream in the direction of the arrows 33. The plates 32 can have a generally sinosoidal configuration so as to change the direction of the gas flow therebetween and can be provided with collecting compartments 34 and 35 projecting into the gas flow and serving to collect liquid by impingement therefrom.

The liquid flow downwardly and can be drained from the collecting compartments 36 externally of the partition 13 (FIG. 1) to the sump as desired.

Spray nozzles 37 and 38 can be provided to spray the register walls with water to clean them from collected particulates and deposits.

I claim:

1. A scrubber for an apparatus for the desulfurization of a boiler flue gas, comprising:
   an upright substantially cylindrical column;
   inlet means for admitting a flue gas to be scrubbed to said column at a lower portion thereof;
   means forming a sump collecting scrubbing liquid in said column below said inlet means;
   means connected with said column for introducing a scrubbing liquid into said column and means in said column for spraying scrubbing liquid into a rising stream of said flue gas in said column;
   means forming a head with a circular cross section at an upper end of said column, said head being formed with a radial outlet for scrubbed flue gas;
   a partition in said head defining an elongated slot-shaped central passage extending along a diameter of said circular cross section in a direction of said radial outlet between an interior of said head and a portion of the column below said head, said scrubbed flue gas passing through said slot-shaped central passage into said head;
   a pair of liquid-separator registers flanking said slot-shaped central passage in said head along opposite longitudinal sides of said slot-shaped central passage and traversed by said scrubbed flue gas so that said scrubbed flue gas passes into spaces outwardly of said registers and communicating with said radial outlet; and
   a further liquid-separator register in said head upstream of said radial outlet and disposed at an end of said slot-shaped central passage proximal to said radial outlet, each of said registers comprising an array of impingement baffles recovering liquid entrained by the scrubbed flue gas traversing the registers as said scrubbed flue gas passes into said radial outlet.

2. The scrubber defined in claim 1 wherein said partition is inclined inwardly and upwardly to said slot-shaped central passage.

3. The scrubber defined in claim 1 wherein said liquid-separator registers of said pair form register walls extending upwardly from said slot-shaped central passage, said register walls converging in a direction of flow of the scrubbed flue gas.

4. The scrubber defined in claim 1, further comprising another liquid-separator register extending across said radial outlet downstream from said head.

5. The scrubber defined in claim 1, further comprising spray nozzles for rinsing said baffles.

6. The scrubber defined in claim 1, further comprising means for withdrawing a suspension of calcium sulfate or calcium sulfite from said sump.

7. The scrubber defined in claim 6 wherein said partition is inclined inwardly and upwardly to said slot-shaped central passage.

8. The scrubber defined in claim 7 wherein said liquid-separator registers of said pair form register walls extending upwardly from said slot-shaped central passage, said register walls coverging in a direction of flow of the scrubbed flue gas.

9. The scrubber defined in claim 8, further comprising another liquid-separator register extending across said radial outlet downstream from said head and provided with impingement baffles.

10. The scrubber defined in claim 9, further comprising spray nozzles for rinsing said baffles.

* * * * *